United States Patent
Kumar et al.

(10) Patent No.: US 12,141,952 B2
(45) Date of Patent: Nov. 12, 2024

(54) EXPOSURE DEFECTS CLASSIFICATION OF IMAGES USING A NEURAL NETWORK

(71) Applicant: Adobe Inc., San Jose, CA (US)

(72) Inventors: Akhilesh Kumar, San Jose, CA (US); Zhe Lin, Fremont, WA (US); William Lawrence Marino, Hockessin, DE (US)

(73) Assignee: Adobe Inc., San Jose, CA (US)

( * ) Notice: Subject to any disclaimer, the term of this patent is extended or adjusted under 35 U.S.C. 154(b) by 187 days.

(21) Appl. No.: 17/957,639

(22) Filed: Sep. 30, 2022

(65) Prior Publication Data

US 2023/0024955 A1  Jan. 26, 2023

Related U.S. Application Data

(63) Continuation of application No. 16/888,473, filed on May 29, 2020, now Pat. No. 11,494,886.

(51) Int. Cl.
  *G06N 3/08*  (2023.01)
  *G06N 5/04*  (2023.01)
  *G06T 7/00*  (2017.01)

(52) U.S. Cl.
  CPC ............ *G06T 7/0002* (2013.01); *G06N 3/08* (2013.01); *G06N 5/04* (2013.01); *G06T 2207/20081* (2013.01)

(58) Field of Classification Search
  CPC .. G06N 3/08; G06N 5/04; G06T 2207/20081; G06T 7/0002; G06T 11/00; G06T 5/00;
  (Continued)

(56) References Cited

U.S. PATENT DOCUMENTS 7,333,650 B2 * 2/2008 Yamamoto ............ G06T 7/0004
                                                              382/156
9,311,531 B2 * 4/2016 Amtrup ................ G06V 30/418
(Continued)

FOREIGN PATENT DOCUMENTS

CN      109977754 A      7/2019
CN      110163810 A      8/2019
(Continued)

OTHER PUBLICATIONS

Ning Yu, "Learning to Detect Multiple Photographic Defects," May 7, 2018, 2018 IEEE Winter Conference on Applications of Computer Vision (WACV), pp. 1387-1394.*

(Continued)

*Primary Examiner* — Omar S Ismail
(74) *Attorney, Agent, or Firm* — Shook, Hardy & Bacon L.L.P.

(57) ABSTRACT

Embodiments of the present invention provide systems, methods, and computer storage media for detecting and classifying an exposure defect in an image using neural networks trained via a limited amount of labeled training images. An image may be applied to a first neural network to determine whether the images includes an exposure defect. Detected defective image may be applied to a second neural network to determine an exposure defect classification for the image. The exposure defect classification can includes severe underexposure, medium underexposure, mild underexposure, mild overexposure, medium overexposure, severe overexposure, and/or the like. The image may be presented to a user along with the exposure defect classification.

20 Claims, 6 Drawing Sheets

(58) Field of Classification Search
CPC ......... G06T 3/00; G06T 7/00; G06T 2211/00; G06T 2215/00; G06T 2201/00; G06T 2207/00
See application file for complete search history.

(56) References Cited

U.S. PATENT DOCUMENTS

| | | | |
|---|---|---|---|
| 2008/0304056 A1* | 12/2008 | Alles | G03F 1/84 382/149 |
| 2009/0167907 A1* | 7/2009 | Utsugi | H04N 25/68 348/E9.037 |
| 2010/0014776 A1* | 1/2010 | Marchesotti | G06V 40/162 382/275 |
| 2012/0070064 A1* | 3/2012 | Gallagher | G03F 1/70 382/199 |
| 2013/0314568 A1* | 11/2013 | Vranceanu | G06T 5/40 348/239 |
| 2015/0078629 A1* | 3/2015 | Gottemukkula | G06F 18/22 382/117 |
| 2017/0262723 A1* | 9/2017 | Kozitsky | G06V 20/62 |
| 2018/0150947 A1* | 5/2018 | Lu | G06T 11/001 |
| 2018/0268533 A1* | 9/2018 | Mech | G06T 7/0002 |
| 2019/0005356 A1* | 1/2019 | Tsunoda | G06V 10/776 |
| 2019/0095753 A1* | 3/2019 | Wolf | G06V 30/1983 |
| 2019/0187555 A1* | 6/2019 | Lin | G06N 3/045 |
| 2019/0355113 A1* | 11/2019 | Wirch | G06T 7/136 |
| 2020/0026282 A1* | 1/2020 | Choe | G05D 1/0257 |
| 2020/0045256 A1* | 2/2020 | Hosono | H04N 17/002 |
| 2020/0125992 A1* | 4/2020 | Agarwal | G06N 3/084 |
| 2020/0126210 A1* | 4/2020 | Li | G06T 7/0004 |
| 2020/0161005 A1* | 5/2020 | Lyman | G06N 5/04 |
| 2020/0175337 A1* | 6/2020 | Ho | G06F 18/2433 |
| 2020/0219245 A1* | 7/2020 | Doggett | G06V 10/764 |
| 2020/0234402 A1* | 7/2020 | Schwartz | G06T 5/70 |
| 2020/0265567 A1* | 8/2020 | Hu | G06T 5/50 |
| 2021/0104321 A1* | 4/2021 | Lipsky | G16H 70/40 |
| 2021/0374931 A1* | 12/2021 | Kumar | G06V 10/82 |
| 2021/0401407 A1* | 12/2021 | Yang | G06N 3/08 |

FOREIGN PATENT DOCUMENTS

| | | |
|---|---|---|
| EP | 3 948 770 A1 | 2/2022 |
| WO | 2019/114147 A1 | 6/2019 |
| WO | 2020/201772 A1 | 10/2020 |

OTHER PUBLICATIONS

Cristiano R. Steffens,"CNN Based Image Restoration," Jan. 11, 2020,Journal of Intelligent & Robotic Systems (2020) 99, pp. 611-612,622-624.*

Weihuang Liu,"Convolutional Two-Stream Network Using Multi-Facial Feature Fusion for Driver Fatigue Detection," May 14, 2019, Future Internet 2019, 11(5), pp. 2-7.*

Mahmoud Afifi, "Learning to Correct Overexposed and Underexposed Photos," Mar. 25, 2020, https://www.researchgate.net/publication/340223694 pp. 6-16.*

Cristiano Rafael Steffens,"Deep Learning based Exposure Correction for Image Exposure Correction with Application in Computer Vision for Robotics," Dec. 27, 2018, 2018 Latin American Robotic Symposium, 2018 Brazilian Symposium on Robotics (SBR) and 2018 Workshop on Robotics in Education (WRE), pp. 194-199.*

Jing Wang et al., "Exposure correction using deep learning," May 13, 2019, Journal of Electronic Imaging, vol. 28(3), 033003 (2019), pp. 033003-01-11.*

Qing Zhang,"High-Quality Exposure Correction of Underexposed Photos," Oct. 22-26, 2018, MM'18, Oct. 22-26, 2018, Seoul, Republic of Korea,pp. 582-589.*

Jianrui Cai,"Learning a Deep Single Image Contrast Enhancer from Multi-Exposure Images," Jan. 15, 2018, IEEE Transactions on Image Processing, vol. 27, No. 4, Apr. 2018, pp. 2049-2060.*

Afifi, M., et al., "Learning to Correct Overexposed and Underexposed Photos", arXiv:2003.11596v1, pp. 1-23 (Mar. 25, 2020).

Cai, J., et al., "Learning a Deep Single Image Contrast Enhancer from Multi-Exposure Images", IEEE Transactions on Image Processing, vol. 27, No., 4, pp. 2049-2062 (Apr. 2018).

Liu, W., et al., "Convolutional Two-Stream Network Using Multi-Facial Feature Fusion for Driver Fatigue Detection", Future Internet, vol. 11, No. 115, pp. 1-13 (May 14, 2019).

Steffens, C. R., et al., "CNN Based Image Restoration | Adjusting Ill-Exposed sRGB Images in Post-Processing", Journal of Intelligent & Robotic Systems, vol. 99, pp. 609-627 (Jan. 11, 2020).

Steffens, C. R., et al., "Deep Learning based Exposure Correction for Image Exposure Correction with Application In Computer Vision for Robotics", Latin American Robotic Symposium, Brazilian Symposium on Robotics (SBR) and Workshop on Robotics in Education (WRE), pp. 194-200 (2018).

Wang, J., et al., "Exposure correction using deep Learning", Journal of Electronic Imaging, vol. 28, No. 3, pp. 1-15 (May/Jun. 2019).

Yu, N., et al., "Learning to Detect Multiple Photographic Defects", IEEE Winter Conference on Applications of Computer Vision (WACV), pp. 1387-1396 (2018).

Zhang, Q., et al., "High-Quality Exposure Correction of Underexposed Photos", Association for Computing Machinery, Session: FF-3, pp. 582-590 (Oct. 22-26, 2018).

Combined Search and Examination Report received for Great Britain Patent Application No. GB2208088.1, mailed on Nov. 30, 2022, 9 pages.

Office Action received for Chinese Patent Application No. 202110272384.2, mailed on May 23, 2024, 13 pages (6 pages of Original OA and 7 pages of English Translation).

* cited by examiner

| Image 410 | Confidence Score 420 | Binary Model Classification 430 | Exposure Score 440 | Exposure Defect Classification 450 |
|---|---|---|---|---|
| 412 | 0.00262324 — 422 | Well Exposed — 432 | - | - |
| 414 | 0.9997311 — 424 | Defective — 434 | 0.916261 — 444 | Severe Overexposure — 454 |
| 416 | 0.7985233 — 426 | Defective — 436 | 0.375255 — 446 | Medium Underexposure — 456 |

EXPOSURE DEFECTS CLASSIFICATION OF IMAGES USING A NEURAL NETWORK

CROSS-REFERENCE TO RELATED APPLICATIONS

This application is a Continuation of U.S. patent application Ser. No. 16/888,473 filed May 29, 2020, the entire contents of which are incorporated by reference herein in their entirety.

BACKGROUND

With the proliferation in the number of channels (e.g., cell phones, portable cameras, laptops, tablets) on which digital content (images, videos, animations) is created and consumed, efficiently detecting and organizing defective content prior to consumption has become of utmost importance. Increasing use of portable and convenient devices with sensors (e.g., cameras) to capture and store digital media has allowed users to collect a vast amount of media. Additionally, a variety of applications, such as but not limited to Adobe® Stock, Adobe® Lightroom®, etc., provide large repositories of images for user consumption. In such applications, the images may be uploaded by users of the applications.

Digital images, captured by both novice and expert photographers, can often suffer from exposure defects, such as overexposure and underexposure. With the increasingly larger collections of digital media, detecting such exposure defects has become increasingly important in order to maintain certain quality for the media collection. However, exposure defect detection often requires balancing the need for accurate detection with the need for efficiency. Detecting exposure defects in digital media becomes especially cumbersome when a vast amount of media is stored by a user or in an application repository. Current exposure defect detection solutions are inadequate in providing such balance. Typically, with existing solutions, users have to manually detect media with exposure defects. In some cases, the cost and tedium of manual detection may lead to user frustration or user accepting subpar content, thereby limiting the usability of the digital media repositories.

SUMMARY

Embodiments of the present invention are directed to exposure defects classification system to efficiently and accurately detect and classify exposure detects in images using a neural network trained via a limited amount of labeled training data. In this regard, an image may be applied to a first neural network trained to determine whether the image includes an exposure defect. The image may then be applied to a second neural network if the image is determined to include an exposure defect. The second neural network may be trained to classify the image as including an overexposure defect or an underexposure defect. In some embodiments, the second neural network may output an exposure score that indicates a level of underexposure and/or overexposure in the input image. The levels may correspond to exposure defect classification types, such as but not limited to, medium overexposure, severe overexposure, mild overexposure, medium underexposure, severe overexposure, and/or mild overexposure. Images with exposure defects may then be presented and/or stored based on the classification and/or the scores.

As such, a user can be efficiently, effectively, and automatically provided with pertinent information regarding exposure defects present images. This enables the user to easily delineate relevant information about the underlying images without having to visually search through an entire image gallery to find images that may suffer from exposure defects, allowing the user to remove and/or fix the defective images efficiently.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein:

FIG. 4 illustrates an example output of the defect detection system, in accordance with embodiments of the present invention;

DETAILED DESCRIPTION

Overview

Figure 1:
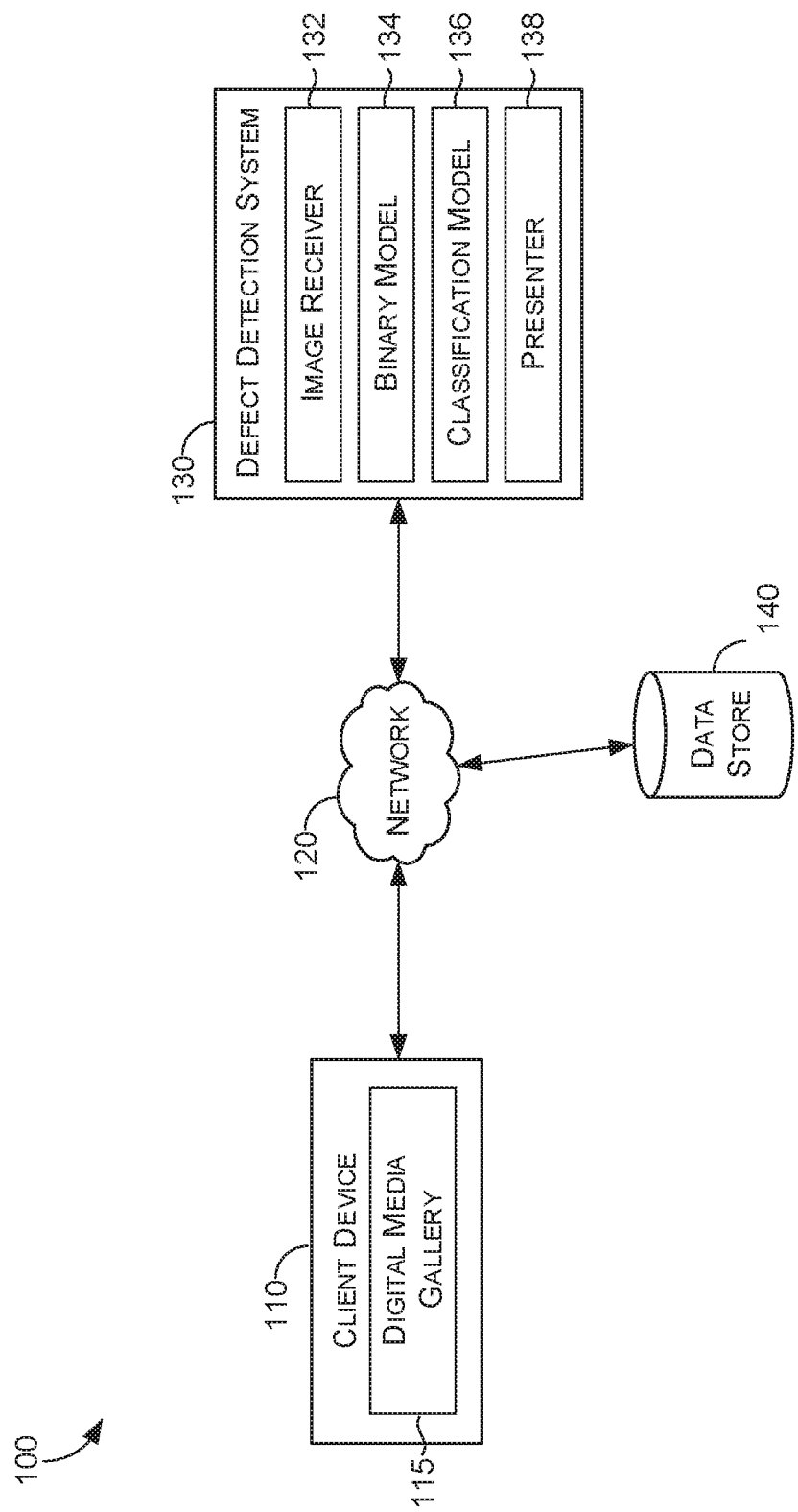
FIG. 1 is a block diagram of an exemplary environment suitable for use in implementing embodiments of the invention, in accordance with embodiments of the present invention.

The proliferation in the number of channels on which digital medial can be created and consumed has increased significantly over the years resulting in an extensive amount of digital content. For example, digital media, such as images, can be captured by various electronic devices having sensors, including digital cameras, drones, camcorders, etc. Captured digital media, such as images, videos, etc., can be stored in repositories, such as digital albums, Adobe® Stock, Adobe® Lightroom®, etc.

Such captured digital media, however, often suffers from exposure defects, such as overexposure and underexposure. Specifically, an image suffers from overexposure when more light falls on the sensor capturing the digital image than required, such as when an object captured is too bright. Overexposure results in a loss of detail in a digital image. As such, overexposed images can often include a bright or white area(s) where excessive light was encountered. Further, underexposure occurs when less light falls on the sensor capturing the digital image than required, such that an object appears very dark in the digital image. Underexposure results in a loss of detail corresponding to the object. As a result, underexposed images can often include a dark or black area(s) where too little light was encountered.

As exposure defects occur in association with digital media, detecting digital media having such exposure defects can be valuable to users to enable a more optimal and efficient user experience, particularly as the amount of digital content increases. As one example, an extensive amount of digital media content may be accessible via a digital album (e.g., Adobe® Stock). A user may desire to access and/or utilize images in the digital album having a good exposure, such that the amount of detail in the image is optimal to a viewer. Accordingly, an individual or entity may selectively remove or flag digital media having poor exposure to increase or improve the quality of digital media accessible via the digital album.

Currently, to detect exposure defects in digital media, one approach requires users to manually detect media with exposure defects. For examples, this conventional approach requires a user to manually determine which images or frames (e.g., video frames, animation frames) include an exposure defect, and either flag or delete those images or frames. Such manual detection can become increasingly cumbersome as the collection becomes larger. Further, this approach requires the user to arbitrarily detect exposure defects in the images or frames. Such arbitrary manual detection can often be subjective, and lead to misclassification of media.

Another conventional approach includes using an image editing software to detect exposure defects in each image or frame using histograms. In this regard, an image editing software may generate a histogram representing tonal values of a digital image or frame in a graph. Specifically, the histogram represents amounts of tones of particular brightness in the image or frame, ranging from back to white with increasing brightness. A histogram for an overexposed image or frame, for example, may include a graph with high white tone values. Similarly, an underexposed image may be represented in a graph with high black tone values. A user of the image editing software may perform a histogram analysis for each digital image or frame to determine whether exposure defects exist in any of the images/frames. However, such individual analysis for each image or frame can be time-consuming. Further, the tonal values in the histogram may also be affected by sensor settings, the photographed scene, vision of the user, etc. As such, the histogram may not always provide accurate analysis of an image's exposure, and can often lead to incorrect classification of images or frames as good, overexposed, and/or overexposed.

Accordingly, embodiments described herein are directed to facilitating efficient and accurate detection and classification of exposure defects of digital images. In particular, embodiments described herein generally detect and classify exposure defects without relying on tonal histograms or extensive manual classifications and/or labeling. To this end, embodiments are directed to automatically detecting and classifying exposure defects in digital media (e.g., images, video frames, animation frames) using trained neural networks. Generally, the automatically classified digital media is accurately classified as including a well-exposed media, an overexposed media, an underexposed media, and/or the like. Such classifications can then be used, for example, to improve quality of images, curate images, organize presentation of images, or the like.

In implementation, a neural network(s) first determines whether or not an image includes an exposure defect and, if the image includes an exposure defect, the same or a different neural network(s) determines an exposure defect classification based on a level of exposure defect in the image. At a high level, in embodiments, a neural network(s) is used to detect exposure defects and provide classifications thereof in images. The neural network(s) may be trained and used to predict exposure levels (e.g., overexposure, underexposure, good exposure) for each digital image that may be used to classify images stored in a device, in cloud, and/or a digital media repository. The present system may classify images into different levels of exposure, such as severely overexposure, mild overexposure, medium overexposure, severe underexposure, mild underexposure, medium underexposure, good exposure (e.g., well-exposed, no exposure defect), and/or the like. In contrast to the conventional solutions that require a user to perform a histogram analysis on each image or subjectively classify each image, the present system predicts exposure defects represented in images automatically using a neural network(s) trained on a limited amount of manually labeled training data and/or noisy data. The present system allows for a more robust and efficient manner of predicting exposure defects within digital images that can then be used to perform various functions, such as organizing the digital images by a level of exposure, deleting defective images, flagging defective images, change the exposure of defective images, etc.

In some examples, for any received media (e.g., image, video, animation), a first neural network may be used to determine whether the media includes an exposure defect. The neural network may be trained to classify one or more frames (e.g., images, frames of a video) of the media as a good or a bad exposure frame or image. The frames or images determined to include an exposure defect (e.g., bad exposure frame) may then be applied to a second neural network to determine a level of exposure for each image. The level of exposure may include an exposure score and/or an exposure defect classification for each of the frames or images determined to include an exposure defect. For examples, each frame or image may be scored between 0 and 1, with 0 indicating a severe level of underexposure and 1 indicating a severe level of overexposure. In such examples, exposure defect classifications may include severely overexposure, mild overexposure, medium overexposure, severe underexposure, mildly underexposure, medium underexposure, etc. In this way, each frame or image may be classified as a well-exposed (e.g., good exposure) if the corresponding frame is determined to not include an exposure defect, and as one of the exposure defect classifications above.

The frames or images may then be presented to a user based on the classifications. The classifications may be used to perform various functions, such as organizing the digital frames or images by a level of exposure, deleting defective images, flagging defective images, change the exposure of defective images, etc. In one example, a user may be presented with the defective images or frames and/or corresponding levels of exposure. The user may be presented with options as to removing/deleting one or more of the defective frames or images, fix exposure in the one or more of the defective frames or images, and/or the like. In other examples, the defective frames or images may be presented with different tags or flags based on the levels of exposures. In some other examples, the user may be presented with a robust graphical representations of the number of frames or images detected to include exposure defects in a set of images. For examples, a ratio of well-exposed and defective frames or images may be presented. Ratios of well-exposed and other classifications may also be presented.

In some examples, the first neural network may be trained using a weak supervised learning algorithm such that a small set of labeled training images may be used to generate more training images from a noisy dataset. First, a neural network may be initially trained to detect whether an image includes an exposure defect using a small set of labeled images. The initially trained neural network may then be re-trained using a noisy dataset of images by determining an inference score for each image in the noisy dataset using the trained neural network. The inference scores of the noisy data set may then be used to determine a threshold score for classifying each image as a well-exposed or a defective image. The threshold score may be determined based on a distribution ratio of the well-exposed and the defective images in the labeled training images, such that the threshold score provides the same distribution ratio of the well-exposed and defective images in the noisy dataset. The images below the threshold score may be classified as well-exposed images, and images above the threshold score may be classified as defective images. In some examples, one or more miss-classified images may be removed from the noisy dataset. The miss-classified images may be images wrongly classified as well-exposed images in the defective images classification. The new noisy dataset with the classifications may then be used to re-train the neural network. The re-trained neural network may then be used as the first neural network at inference to detect whether image(s) or frame(s) include exposure defects. In this way, the first neural network may be trained using a larger dataset without requiring manual labeling of each image in the noisy dataset.

In some examples, the first neural network and the second neural network may share a number of top layers, but include one or more bottom layers (e.g., fully connected layers) trained for binary defect detection and level of defect detection, respectively. Each network may be trained using a different learning rate (e.g., weight) for each layer. In some examples, the fully connected layer(s) of the second neural network may be trained using training images labeled with five classifications or classification scores from 0 to 1, including 0, 0.25, 0.5, 0.75, and 1. The classifications may indicate a level of exposure, such as severe underexposure, mild underexposure, medium overexposure/underexposure, mild overexposure, and severe overexposure, respectively. In this way, the first neural network may be trained to detect existence of an exposure defect in images and the second neural network may be trained to detect a level of exposure in the defective images.

Aspects of the technology disclosed herein provide a number of advantages over previous solutions. For instance, one previous approach involves labeling media manually. However, that approach does not take into account subjective bias of the labeler to intelligently and consistently determine images suffering from exposure defects in an automatic and accurate way. Such manual detection or determination becomes increasingly cumbersome as the collection becomes larger and suffers from misclassification of images, unable to provide accurately labeled images. Further, another previous approach requires a user to perform a histogram analysis for each image, making the process time-consuming. This previous approach is also constricted to assuming that the histogram always provides accurate analysis of an image's exposure, and can often lead to incorrect classification of images as good, overexposed, and/or overexposed images.

To avoid such constraints on the present system, embodiments of the technology described herein, for instance, systematically develop an algorithm to detect and classify exposure defects in images using one or more neural networks to generate automatic, consistent and accurate classification of images without requiring manually labeling a large amount of training data (e.g., training images). Unlike the conventional systems, the embodiments of the present technology leverage a small data set of labeled training images to generate a large classified or labeled dataset from a noisy dataset of images to train a neural network to detect existence of exposure defects in images. Further, the embodiments of the present technology leverage the results of the trained neural network to detect level of defect in images by applying the defective images to another neural network. Embodiments of the present technology may allow for accurate and efficient determination and classification of underlying exposure defects for digital media by using neural networks specifically trained using limited training data to automatically detect exposure defects and/or their corresponding levels in digital media.

Digital Media Exposure Defects Detection Environment

Referring now to FIG. 1, a block diagram of exemplary environment 100 suitable for use in implementing embodiments of the present invention is shown. Generally, environment 100 is suitable for facilitating exposure defects detection in digital media, and among other things, facilitates an exposure defects classification of digital media using neural network(s) trained to detect and classify exposure defects in digital media.

Environment 100 includes a network 120, a client device 110, a data store 140, and a defect detection system 130. In the embodiment illustrated in FIG. 1, the client device 110 includes a digital media gallery 115. Generally, the digital media gallery 115 includes a collection of media. As described herein, the digital media gallery 115 can, in some embodiments, present an exposure-based organization of the collection of media. The client device 110 can be any kind of computing device capable of collecting and/or presenting media (e.g., via an exposure-based organization of media). For example, in embodiments, client device 110 can be a computing device such as computing device 600, as described below with reference to FIG. 6. In embodiments, client device 110 can be a personal computer (PC), a laptop computer, a workstation, a mobile computing device, a PDA, a cell phone, or the like. The components of environment 100 may communicate with each other via network 120, which may include, without limitation, one or more local area networks (LANs) and/or wide area networks (WANs). Such networking environments are commonplace in offices, enterprise-wide computer networks, intranets, and the Internet.

Generally, in response to obtaining a collection of media in a digital media gallery, a detection and determination of exposure classifications for each media can be made using an algorithm to predict an exposure defect type that leverages neural network(s) trained using a limited amount of labeled data. By adopting such algorithms of the present disclosure to detect and classify exposure defects in media, a collection of media may be classified in a contextual and intelligent way so as to provide a user with pertinent information regarding the exposure of underlying media.

The digital media gallery 115 may be incorporated, or integrated, into an application or an add-on or plug-in to an application. The application may generally be any application capable of facilitating a digital media organization, and may be a stand-alone application, a mobile application, a web application, or the like. In some implementations, the application comprises a web application, which can run in a web browser, and could be hosted at least partially server-side. In addition, or instead, the application can comprise a dedicated application. In some cases, the application can be integrated into the operating system (e.g., as a service). Although generally discussed herein as the digital media gallery 115 being associated with an application, in some cases, the digital media gallery 115, or a portion thereof, can be additionally or alternatively integrated into the operating system (e.g., as a service) or a server (e.g., a remote server). In some examples, the digital media gallery 115 may be stored in a cloud computing environment.

The digital media gallery 115 of client device 110 may include a user interface or application allowing the user to store or submit media. Any suitable user interface and input component may be used, such as those described with respect to I/O components 620 of FIG. 6. Various amounts and/or types of media may be received for exposure defects detection. For example, the digital media gallery 115 can accept images, videos, animations, slideshows, and the like. In some embodiments, the digital media gallery 115 may receive a collection of media for exposure defect detection. Generally, the digital media gallery 115 is in communication with the defect detection system 130 via network 120, and may send the media or collection of media from the client device 110 to the defect detection system 130 for processing. Although the collection of media is described as being sent to the defect detection system 130, this need not be the case, as any or all of the components of the defect detection system 130 may be located on the client device 110, data store 140, or elsewhere. Further, the media collection may be stored in association with the defect detection system 130 and accessible via a digital media gallery application operating on a client device.

The data store 140 can store a plurality of media and corresponding exposure defect classifications. In some examples, the data store 140 may include a repository of classification types (e.g., good exposure, severe overexposure, mild overexposure, medium overexposure, severe underexposure, mild underexposure, medium underexposure, etc.) and their corresponding features (e.g., scores, score ranges) in relation to the classification types. In some examples, the data store 140 may also include training datasets used to train one or more neural networks, such as but not limited to, a binary model 134 and classification model 136, of the defect detection system 130. The training datasets may include labeled data set, unlabeled dataset, noisy dataset, re-training dataset, etc. Each classification type may be associated with corresponding scores and/or score ranges. For examples, severe underexposure classification may be associated with an exposure score (e.g., threshold score) of 0, and/or an exposure score range of 0-0.25, the medium underexposure classification may be associated with an exposure score of 0.25 and/or an exposure score range of 0.25-0.5, the mild underexposure classification may be associated with an exposure score of 0.5 and/or an exposure range of 0.45-0.5, etc. In one example, the classification types may be associated with exposure scores between 0 to 1 such that a score closer to 0 indicates severe underexposure and a score closer to 1 indicating severe overexposure.

The defect detection system 130 is generally configured detect and classify exposure defects. Generally, and at a high level, the defect detection system 130 obtains (e.g., receives or retrieves) a media or a collection of media and determines an exposure defect classification for each media that best represents a level of exposure encountered in the media. The defect detection system 130 may receive an image(s) or a frame(s) (e.g., a video frame, an animation frame) from the digital media gallery 115 of the client device 110. In some examples, the defect detection system 130 may receive the image(s) from the data store 140. In some examples, the defect detection system 130, or portion thereof, may be a part of the digital media gallery 115. In other examples, the defect detection system 130 may be located on a remote server, such that the digital media gallery 115 may communicate with the defect detection system 130 via network 120. In the embodiments illustrated in FIG. 1, the defect detection system 130 includes an image receiver 132, a binary model 134, a classification model 136, and a presenter 138. Although the examples given herein generally relate to images, this is for example purposes only. For example, the present system may function similarly to detect exposure defects in other forms of digital media as well, such as but not limited to, videos, animations, and/or the like.

The defect detection system 130 is generally configured to detect and classify images based on a detected level of exposure in each image. Specifically, the defect detection system 130 may determine whether an image suffers from an exposure defect and/or a type (e.g., level) of exposure defect in the image. System 130 scores images using a neural network(s) to indicate a level of exposure in the images. The defect detection system 130 may use two neural networks to first determine whether an image suffers from an exposure defect and, in response to determining that the image includes an exposure defect, to then determine a level of exposure defect in the image and classify the images into types of exposure defects. The level of exposure defect may be used to determine a classification of the image to present to the client device 110.

The image receiver 132 may receive, retrieve, access, or obtain an image or a collection of images ("image(s)"), for example, from the digital media gallery 115 of client device 110. In some embodiments, the received image(s) may correspond to image(s), frame(s) representing a video (e.g., snapshots of video), and/or sensor data representing representations of sensory fields of sensors (e.g., depth maps or point clouds for LIDAR sensors, a value graph for ultrasonic sensors, etc.). Images may be in any of a number of formats, such as, for example and without limitation, compressed images such as in Joint Photographic Experts Group (JPEG) or Luminance/Chrominance (YUV) formats, compressed images as frames stemming from a compressed video format such as H.264/Advanced Video Coding (AVC) or H.265/High Efficiency Video Coding (HEVC), raw images such as originating from Red Clear Blue (RCCB), Red Clear (RCCC), or other type of imaging sensor, and/or other formats. In addition, in some examples, the image(s) may be in a raw or captured format (e.g., without any pre-processing, while in other examples, the image(s) may undergo pre-processing (e.g., noise balancing, demosaicing, scaling, cropping, augmentation, white balancing, tone curve adjustment, etc., such as using a sensor data pre-processor (not shown)). For example, the image(s) may be re-sized (e.g., smaller, larger) to a pre-determined size. In other examples, the image(s) may be augmented by rotating or flipping the images by varying (e.g., randomly selected, selected based on a stochastic analysis) degrees. In yet other examples, the image(s) may undergo center cropping. As used herein, the image(s) may reference unprocessed images, pre-processed images, or a combination thereof. The image(s) may include original images (e.g., as captured by one or more image sensors), down-sampled images, up-sampled images, cropped or region of interest (ROI) images, otherwise augmented images, and/or a combination thereof.

Upon receiving or obtaining the image(s), each image may then be applied to the binary model 134. The image(s) may be applied to the binary model as unprocessed image(s), and/or pre-processed image(s). For example, the image(s) may be re-sized (e.g., smaller, larger) images resized to a pre-determined size. In other examples, the image(s) may be augmented images generated by rotating or flipping the images by varying (e.g., randomly selected, selected based on a stochastic analysis) degrees. In yet other examples, the image(s) may be center crops of original images, the size of which may be pre-determined. In another example, the image(s) may be original images resized to a smaller size and then a center crop of the resized image may be taken as the image(s). The images may pre-processed to a size of training images used to train the binary model 134 and/or the classification model 136. For example, if the binary model 134 is trained using images sized or re-sized at a predetermined size (e.g., 224 length by 224 width), the image(s) may also be original images re-sized to the same or similar size as the training images. It should be noted that the pre-processing techniques discussed herein are for example purposes only and any other pre-processing techniques may be used to generate the pre-processed image(s). In some examples, each pixel of image(s) may be associated with value(s) corresponding to an amount of brightness, light, and/or contrast encountered by the pixel.

The binary model 134 is generally be configured to detect whether the image(s) includes or suffers from an exposure defect. The binary model 134 may include a machine learning model trained to score images based on a probability or confidence that an image includes an exposure defect. The binary model 134 may then classify images based on the confidence scores outputted by the machine learning model. In some examples, the machine learning model of the binary model 134 may be trained to classify images into well-exposed and defective images as an output. Each image(s) may be classified, using the binary model 136, into a well-exposed or a defective image based on a corresponding confidence score associated with the image. A well-exposed image classification may indicate that the image includes good or appropriate exposure, and does not include an exposure defect. A defective image classification may indicate that the corresponding image includes an overexposure or an overexposure image defect. Specifically, an image may be classified as a defective image when more or less light falls on the sensor capturing the digital image than required, such as when an object captured is too bright. In some examples, the binary model 136 may be trained to detect bright (e.g., white) areas and dark (e.g., black) areas in the input images to determine whether an image includes an exposure defect (e.g., underexposure, over exposure). A pixel-by-pixel analysis may be done by the binary model 134 to detect amount of exposure (e.g., light, brightness, contrast) in the image.

To classify an image as a well-exposed or defective image, a confidence score may be determined by the binary model 134 for the input image(s). The confidence score may indicate a probability that the corresponding image includes an exposure defect (e.g., underexposure, overexposure). For example, the confidence score may range from 0 to 1 such that the increase in score corresponds to an increased probability that the image includes an exposure defect. In such examples, a confidence score closer to 0 may indicate that the image is well-exposed or includes good exposure, and a confidence score closer to 1 may indicate that the image is defective, or vice versa.

The binary model 134 may use a predetermined confidence threshold to classify an image as a well-exposed image or a defective image. The confidence score may be correlated to the confidence that the image(s) is defective, such that the higher the confidence score for an image, the image is more likely to be defective, or vice versa. For example, the confidence score for an image may be between 0 and 1, with the images with confidence scores below the predetermined confidence threshold 0.5 are determined to be well-exposed images, and the images with the confidence scores at or above the predetermined confidence threshold 0.5 are considered to be defective images, or vice versa.

The binary model 134 may use confidence score thresholds and/or confidence score ranges to determine a classification for the image(s) based on corresponding confidence score generate by the machine learning model. The binary model 134 may apply the image(s) as an input to the trained machine learning model which outputs confidence score and/or a corresponding classification for each of the image(s) based on the pixel-by-pixel analysis of the image(s). The confidence score may be based on a feature analysis of the image, including a pixel-by-pixel analysis, that detects an amount of light, brightness, and/or contrast associated with each pixel of the image. An image including a set of pixels associated with dark areas or light areas, as indicated by pixels in the areas, may be associated with a higher confidence score than an image with an appreciate amount of light or brightness in all areas, or vice versa. The confidence score can then be used by the machine learning model or a separate component of the binary model to classify the image as a well-exposed image or a defect image, as described above.

In an alternative embodiment, a feature-based algorithm may be used as the binary model 134 to classify an image(s) and/or generate corresponding confidence scores for the image(s). A feature-based algorithm refers to an algorithm trained to detect exposure features in images. The exposure features may include light, brightness, and/or contrast in areas of the images that can then be associated with confidence scores indicating a probability that an image includes an exposure defect. The confidence scores may then be used by the feature-based algorithm or a separate component to classify images into well-exposed and defect images based on confidence threshold and/or ranges as described above.

Figure 3:
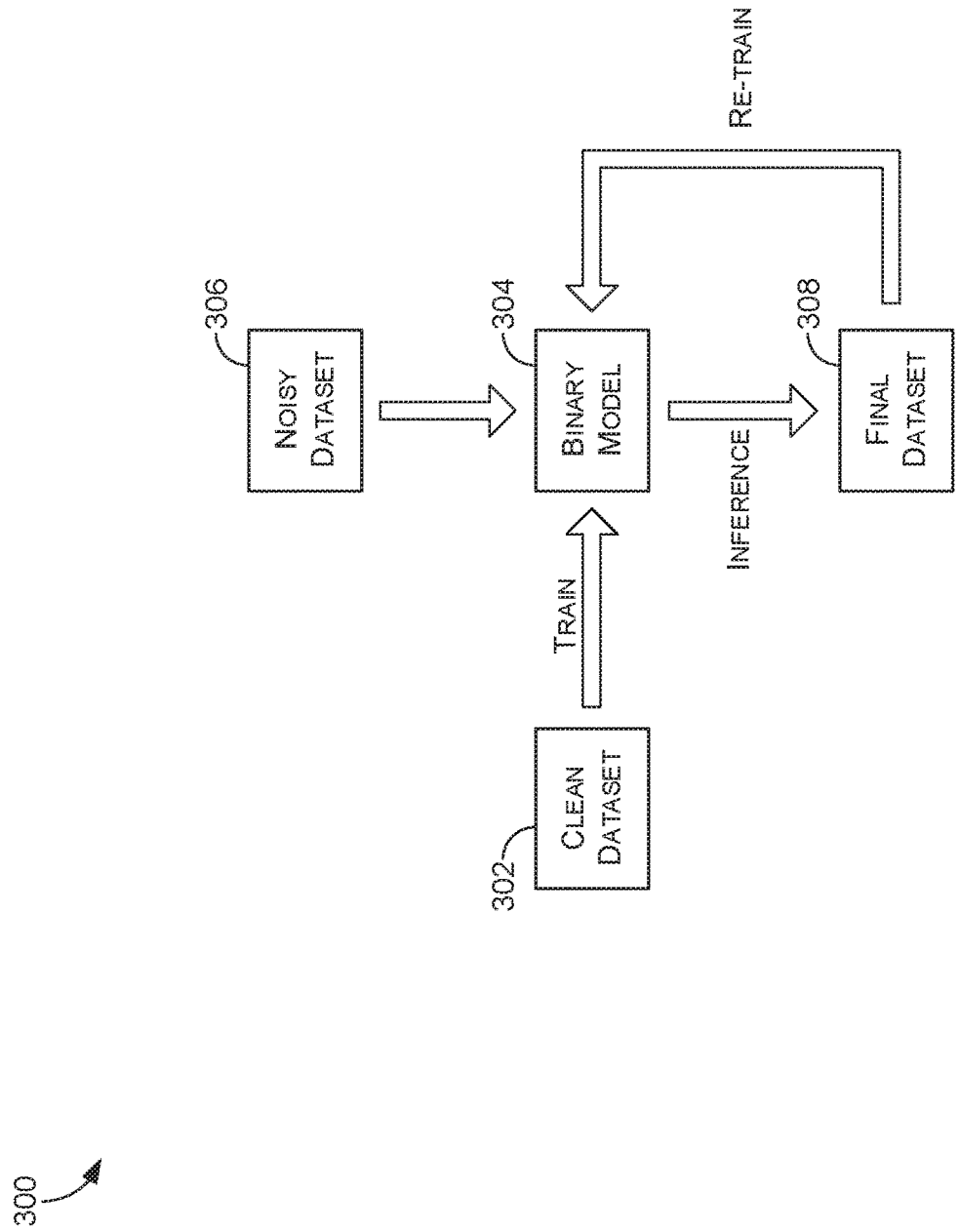
FIG. 3 illustrates an example process for training a binary model, in accordance with embodiments of the present invention.

The binary model 134 may be trained using a training dataset and/or a noisy dataset, in accordance with the description provided with respect to FIG. 3. The binary model 134 may be trained to detect or predict whether an image(s) is a well-exposed image or a defective image. In some examples, the binary model 134 may provide the classification and/or confidence scores corresponding to the image(s) to the presenter 138 for presenting to the client device 110. In other examples, the binary model 134 may be further configured to communicate or send the image(s) corresponding to the predicted defective images to the classification model 136.

Although examples are described herein with respect to using neural networks and specifically convolutional neural networks (CNNs) or deep neural networks (DNNs), as the machine learning model(s) (e.g., binary model 134, classification model 136), this is not intended to be limiting. For example, and without limitation, the machine learning model(s) of the present disclosure may include any type of machine learning model(s), such as a machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, long/short term memory/LSTM, Hopfield, Boltzmann, deep belief, deconvolutional, generative adversarial, liquid state machine, etc.), computer vision algorithms, and/or other types of machine learning models.

The classification model 136 is generally be configured to classify defective images based on a level of exposure in the image(s). The classification model 136 may include a machine learning model trained to score images based on a level of exposure defect detected in the image(s) using a regression algorithm. The classification model 136 may then classify images based on levels of exposures detects in the image(s). In some examples, the machine learning model of the classification model 136 may be trained to classify images. Each image(s) may be classified, using the classification model 136, into an exposure defect classification, such as but not limited to, severe underexposure, medium underexposure, mild underexposure, mild overexposure, medium overexposure, severe overexposure, and/or the like. In some examples, each image(s) may be classified, using the classification model 136, into an underexposure or an overexposure classification. Generally, an exposure defect classification refers to a type or classification of exposure based on an extent or level of the exposure.

To classify an image in relation to exposure defect, an exposure score may also be determined by the classification model 136 for the defective image(s). The exposure score may indicate a level of exposure in the corresponding image. The exposure score may represent both an overexposure or an underexposure defect in an image. For example, the exposure score may range from 0 to 1 such that the increase in score corresponds to an increased level of exposure. In such examples, an exposure score closer to 0 may indicate that the image is severely underexposed, and an exposure score closer to 1 may indicate that the image is severely overexposed, or vice versa. In some examples, an image may be classified as an underexposed image if its corresponding exposure score is below 0.5, and may be classified as an overexposed image if its corresponding exposure score is above 0.5, or vice versa.

The classification model 136 may use exposure score thresholds and/or exposure score ranges to determine the exposure defect classification for the image(s) based on the corresponding exposure score generated by the machine learning model. The classification model 136 may apply the defective image(s) to the trained machine learning model which outputs an exposure score and/or a corresponding exposure defect classification for each of the defective image(s). The exposure score may be correlated to a level of exposure of the image, such that the higher the exposure score for an image, the more exposure is included in the image. The exposure score may be based on a feature analysis of the image, including a pixel-by-pixel analysis, that detects an amount of light, brightness, and/or contrast associated with each pixel of the image. An image including a set of pixels associated with light or white area(s), as indicated by pixels in the areas, may be associated with a higher exposure score than an image with an dark or black area(s), or vice versa. For example, the exposure score for an image may be on a scale between 0 and 1, with the images with an exposure score below 0.25 classified as including severe underexposure, images with an exposure from 2.5 to 0.4 classified as including a medium underexposure, images with an exposure score from 0.4 to 0.5 classified as including a mild underexposure, the images with an exposure score from 0.5 to 0.6 classified as including mild overexposure, the images with an exposure score from 0.6 to 0.75 classified as including medium overexposure, and images with an exposure score over 0.75 classified as including severe overexposure.

In some non-limiting examples, separate machine learning models may be trained to score images for underexposure and overexposure defects. In such examples, one machine learning model may be trained to score the defective images between 0 and 1 for underexposure, with an exposure score of 0 indicating severe underexposure and a score of 1 indicating a mild underexposure, or vice versa. Similarly, another machine learning model may be trained to score the defective images between 0 and 1 for underexposure, with an exposure score of 0 indicating severe overexposure and a score of 1 indicating a mild overexposure, or vice versa. In some other examples, a single machine learning model may be trained to score image differently for the underexposure and overexposure. It should be noted that the above exposure score ranges for the exposure defect classifications are provided for example purposes only, and other ranges and thresholds may similarly be used to classify images into exposure defect classifications.

A machine learning model or a feature-based algorithm may be used as the classification model 136 to classify an image(s) into exposure defect classifications and/or generate corresponding exposure scores for the image(s). In some examples, the machine learning model or the feature-based algorithm may output the exposure scores for the image(s) and another component of the defect detection system 130 may use the exposure scores to generate the corresponding classifications for the image(s) based on the exposure scores.

Figure 2:
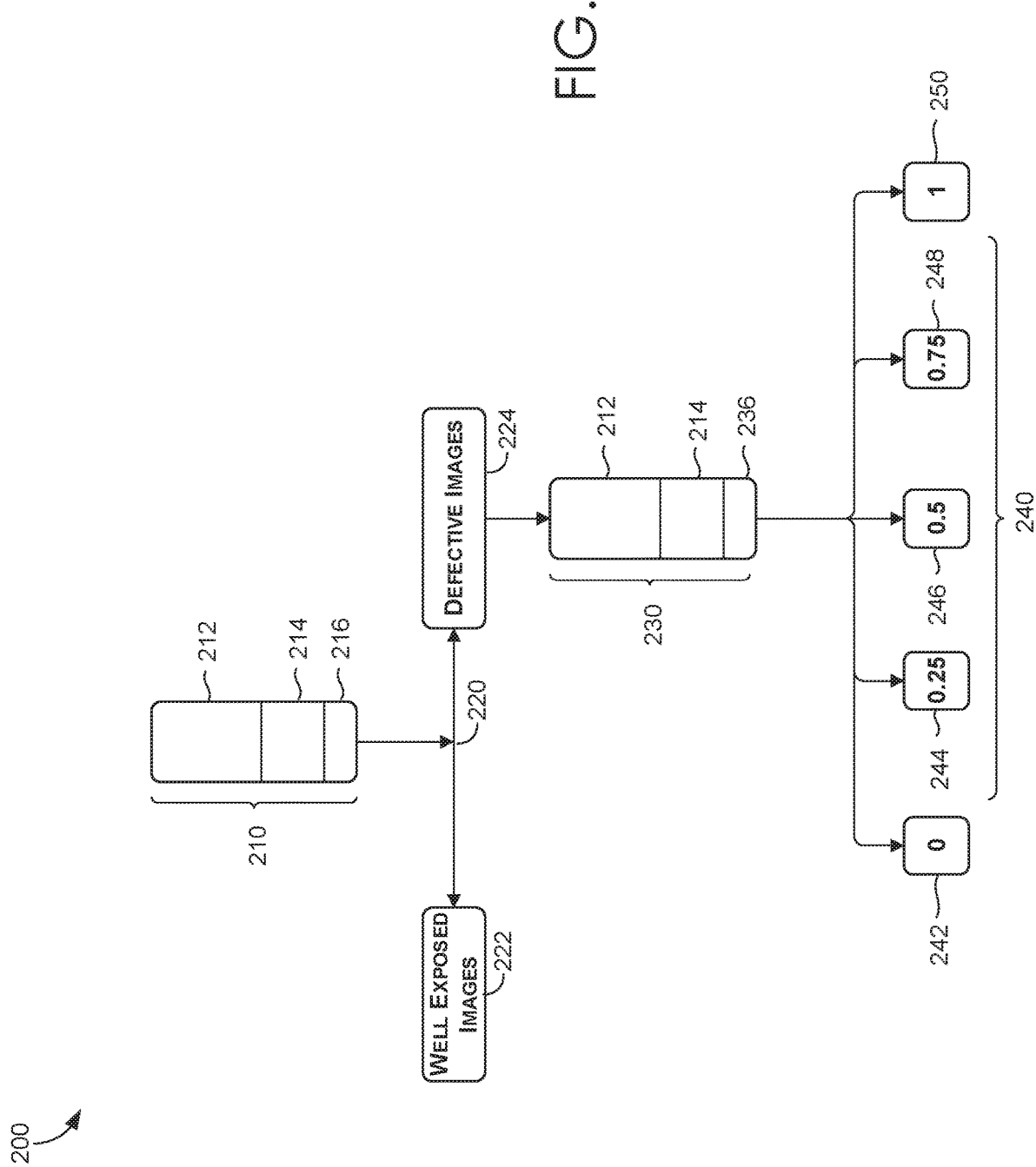
FIG. 2 is a data flow diagram illustrating an example process for exposure defects classification of images using a neural network, in accordance with embodiments of the present invention.

The classification model 136 may be trained using a comparatively small, labeled training dataset, in accordance with the description provided with respect to FIG. 2. The training dataset used to train the classification model 136 may be a set of images labeled with corresponding exposure scores and/or exposure defect classifications. The classification model 136 may be trained to detect or predict a type of exposure defect in an image(s).

In some examples, the classification model 136 may provide the exposure defect classification and/or exposure scores corresponding to the image(s) to the presenter 138 for presenting to the client device 110. In some examples, the classification model 136 may provide the exposure scores to the presenter 138, and the presenter 13 may then classify the images based on the classification scores into the exposure defect classifications. The presenter 138 may use the exposure defect classifications and/or the exposure scores to then present the images in a certain manner as described below. In some examples, the binary model 134 and the classification model 136 may be combined into a single model or neural network to detect defective images and classify them into well-exposed images, and exposure defect classifications. In some examples, the single model may be trained to score images between 0 and 1, with an exposure score of 0 indicating that the image is underexposed (e.g., severely underexposed), an exposure score of 0.5 indicating that the image is a well-exposed image, and an exposure score of 1 indicating that the image is an overexposed image (e.g., severely overexposed), or vice versa. It should be noted that other scoring criteria may be used to score the images as well. The binary model 134, the classification model 136, and/or the combined single model may be stored in data store 140, and can be accessed when images are received for classification.

The presenter 138 is generally configured to receive or obtain the exposure defect classification and/or the exposure scores from the classification model 138 to cause presentation to a user of the client device 110. The image(s) may be presented to the user along with the corresponding exposure defect classification via a user interface of the client device 110. In some examples, exposure defect classification may be used by the presenter 138 to perform various function, such as organizing the image(s) in the digital media gallery 110 by the level of exposure or exposure defect classification. In this regard, the user of the client device 110 may be presented with the image(s) in conjunction with the corresponding exposure defect classification and/or the exposure defect score. In some other examples, the presenter 138 may be configured to delete defective images and only present good images in the digital media gallery 115. In such a case, the presenter 115 may receive classifications for the image (s) and/or the corresponding confidence score(s) from the binary model 134, and the defective image(s) may then be deleted based on the confidence score(s) or the classifications. As can be appreciated, the user of the client device 110 may be presented with the image(s) in conjunction with one or more of corresponding confidence score, classification, exposure defect score, and/or the exposure defect classification.

In some other examples, the defective image(s) may be flagged based on the corresponding exposure defect classification to indicate to the user that the image is defective and/or include the corresponding exposure defect classification. In yet another example, the presenter 138 may be configured to automatically change or fix the exposure of the image(s) based at least in part on the corresponding exposure score and/or the level of exposure. Further, the presenter 138 may be configured to provide the user, via the user interface of client device 110, with selectable options as to removing/deleting one or more of the defective image(s), fix exposure in the one or more of the defective image(s), and/or the like. In some other examples, the presenter 138 may be configured to present the user with a robust graphical representation of the number of image(s) detected to include exposure defects in a set of images. For examples, a ratio of well-exposed and defective frames or images may be presented. Ratios of well-exposed and other classifications may also be presented. In this way, a user may be presented with information regarding exposure defects in image(s) in an efficient, accurate, and user-friendly manner.

Turning to FIG. 2, FIG. 2 illustrates an exemplary data flow diagram illustrating an example process 200 for exposure defects classification of images using a binary model 210 and a classification model 230, in accordance with embodiments of the present invention. The binary model 210, such as the binary model 134 of FIG. 1, may be trained to receive as input images and output predictions classifying the images as well-exposed images 222 or defective images 224. The binary model 210 may be a neural network (e.g., DNN, CNN) including a plurality of convolutional layers and fully connected layers. In some examples, the binary model 210 may include three parts, including a residual neural network layers 212, custom layers 214, and fully connected layers 216. The residual neural network layers 212 may be convolution layers of any known residual neural network, and may include a plurality of layers (e.g., 34, 50, 60, etc.). The custom layers 214 may include one or more layer to connect the residual network layers 212 to the fully connected layers 216. However, any known custom layers may be used.

The fully convolutional layers 216 of the binary model 210 may be trained to classify images as well-exposed images 222 or defective images 224. To do so, the binary model 210 may be trained to predict a confidence score for each image, and classify the image based on the corresponding confidence score being below or above a predetermined confidence threshold 220. In some examples, the predetermined confidence threshold 220 may be 0.5, and the binary network 210 may be train to predict a confidence score for each image between 0 and 1. Accordingly, an image with a confidence score below the predetermined confidence threshold may then be classified as a well-exposed image and an image with a confidence score at or above the predetermined confidence threshold may be classified as a defective image.

The image(s) classified by the binary model 210 to be defective images 224 may then be applied to the classification model 230, such as but not limited to the classification model 136 of FIG. 1, to determine an exposure score 240 for the image(s) and/or classify the defective images into exposure defect classifications. The classification model 230 may be trained to output an exposure score 240 for each defective image based on input defect images 224. The classification model 230 may be a neural network (e.g., DNN, CNN) including a plurality of convolutional layers and fully connected layers. In some examples, the classification model 230 may include three parts, including the residual neural network layers 212, custom layers 214, and fully connected layers 236. The classification model 230 may include the same residual neural network layer 212 and custom layers 214 as the binary model 210. However, the fully convolutional layers 236 of the classification model 230 may be trained detect or determine a level of exposure in defective images.

The classification model 230 may be trained to predict an exposure score 240 for each image indicating a level of exposure of the image. In some examples, the fully connected layers 236 of the classification model 230 may be trained with defective images labelled into five categories between 0 and 1 (e.g., category 242, category 244, category 246, category 248, and category 250) using a regression algorithm. In this way, the classification model 230 may be trained to classify input defective images in five categories, each category or score indicating a level of exposure from severe underexposure to severe overexposure as the score increases from 0 to 1. The defective images 224 may then be classified based on the nearness of the corresponding exposure score to one of the five categories. In some examples, the classification model 230 may also be trained to classify the images into exposure defect classifications. In other examples, the exposure scores outputted by the classification model 230 may be used to then classify the images separately from the model. Category 242 may indicate severe underexposure, category 244 may indicate medium underexposure, category 246 may include mild underexposure or mild overexposure, category 248 may indicate medium overexposure, and category 250 may indicate severe overexposure. For example, a defective image of the defective images 224 with an exposure score 0.1 may be classified as including a severe underexposure because of the nearness of the exposure score 0.1 to category 242 (i.e., closest category). Similarly, a defective image with an exposure score 0.8 may be classified as including a medium overexposure due to its nearness to category 248. As such, images with exposure defects can be automatically detected and classified by leveraging trained neural networks (e.g., binary model, classification model) in an accurate and efficient manner.

In some examples, the binary model 210 and the classification model 230 may each be trained with different learning rates for different layers of the network. In such examples, the learning rate increase from the top layers (e.g., residual neural network layers 212) to the bottom layers (e.g., fully connected layers 216, fully connected layers 236, layers closer to the error function). For example, the first twenty layers of the model may be trained at a lower learning rate than the next twenty layers which may be trained at a lower learning rate than the final layers of the network.

Referring now to FIG. 3, FIG. 3 illustrates an example process 300 for training a binary model 304, in accordance with embodiments of the present invention. The binary model 304 may be a neural network trained using a weak supervised learning algorithm. The binary model 304 may be a neural network, such as but not limited to the binary model 134 of FIG. 1. A clean dataset 302 may be used as ground truth data to initially train the binary model 304. The clean dataset 302 may include a comparatively small dataset of images, each image labelled as a well-exposed image (e.g., good image) or a defective image (e.g., bad image). The clean dataset 302 may be comparatively smaller (e.g., including fewer number of images) than a noisy dataset (e.g., unlabeled dataset of images), such as the noisy dataset 306, used to fully train the neural network. A distribution ratio of the well-exposed images to defective images in the clean dataset 302 may be obtained or determined. A noisy dataset 306 may then be applied to the initially trained binary model 304 to classify the images in the noisy dataset 306 as well-exposed images and defective images. The noisy dataset 306 may include a larger dataset of unlabeled images. The initially trained binary model 304 may predict a confidence score (e.g., inference score) for each image in the noisy dataset 306. The inference scores of the noisy dataset 304 may then be used to determine a threshold score for classifying each image in the noisy dataset 304 as a well-exposed or a defective image. The threshold score may be determined based on the distribution ratio in the clean dataset 302, such that the threshold score provides the same distribution ratio of the well-exposed and defective images in the noisy dataset 306 as the clean dataset 302. The images in the noisy dataset 306 below the threshold score may be classified as well-exposed images, and images above the threshold score may be classified as defective images. The classified images in the noisy dataset 306 may be determined to be the final dataset 308 to use as ground truth data for re-training the binary model 304 to images with exposure defects.

In some examples, one or more miss-classified images may be removed from the noisy dataset 306 to generate the final dataset 308. The miss-classified images may be images in the noisy dataset 304 wrongly classified as well-exposed images by the initially trained binary model 304. The final dataset 308 with the classifications may then be used to re-train the binary model 304. The re-trained binary model 304 may then be used, as the binary model 134 of FIG. 1, to detect whether image(s) include exposure defects in real-time or near real-time. In this way, the binary model 304 network may be trained using a larger dataset without requiring manual labeling of each image in the noisy dataset 306.

In some examples, the final dataset 308 may be further iteratively distilled to remove misclassified images. In such examples, the final dataset 308 may be divided into three subsets: a training set, a validation set, and a holdout set. A classifier or a model may be first trained using the training set and the validation set to detect well-exposed and effective images in the final dataset. The holdout set may then be applied to the trained classifier. A small number (e.g., 5, 10) images from the holdout set may then be removed or deleted from the holdout set that are the most misclassified by the classifier. The training set, validation set, and the new holdout set may then be combined, and the process of removing the misclassified images may be repeated iteratively, a predetermined number of times, to remove misclassified images from the final dataset 308. The distilled final dataset 308 may then be used to re-train the binary model 304. In this way, the binary model 304 may ultimately be trained using a set of training images that are more accurately labeled.

Referring to FIG. 4, FIG. 4 is an illustration of an example output 400 of the defect detection system, in accordance with embodiments of the present invention. For example, the defect detection system 130 of FIG. 1 may receive as input image 412, image 414, and/or image 416 for exposure defect detection and classification. The output 400 may include a confidence score category 420, a binary model classification category 430, an exposure score category 440 and an exposure defect classification category 450 for each image in image category 410. For example, the output of the defect detection system for image 412 may include confidence score 422 (i.e., confidence score of 0.00262324) and the binary model classification 432 (e.g., well-exposed) outputted by a binary model (e.g., binary model 134). The image 412 may not be associated with an exposure score and an exposure defect classification since the image 412 is determined to be a well-exposed image.

Similarly, the output of the defect detection system for image 414 may include confidence score 424 (i.e., confidence score of 0.999731) and the binary model classification 434 (e.g., defective) outputted by a binary model (e.g., binary model 134). As can be appreciated, the binary model classification 434 is based on the confidence score 424 being above a confidence threshold (e.g., 0.5). Further, since the image 414 is predicted to be a defective image, the output corresponding to image 414 may further include an exposure score 444 (i.e., exposure score of 0.916261) and an exposure defect classification 454 (i.e., severe overexposure) outputted by a classification model (e.g., classification model 136). The image 414 may be classified as including severe overexposure based on the exposure score of the image 414 being over close to one.

The output of the defect detection system for image 416 may include confidence score 426 (i.e., confidence score of 0.7985233) and the binary model classification 436 (e.g., defective) outputted by a binary model (e.g., binary model 134). As can be appreciated, the binary model classification 436 is based on the confidence score 426 being above a confidence threshold (e.g., 0.5). Further, since the image 416 is predicted to be a defective image, the output corresponding to image 416 may further include an exposure score 446 (i.e., exposure score of 0.375255) and an exposure defect classification 456 (i.e., medium underexposure) outputted by a classification model (e.g., classification model 136). The image 416 may be classified as including medium underexposure based on the exposure score of the image 416 being over close to 0.25. It should be understood that the images and the associated scores and classifications are for example purposes only, and different scores can be associated with different classifications based on different threshold and ranges used to train respective binary and classification models.

Exemplary Flow Diagram

Figure 5:
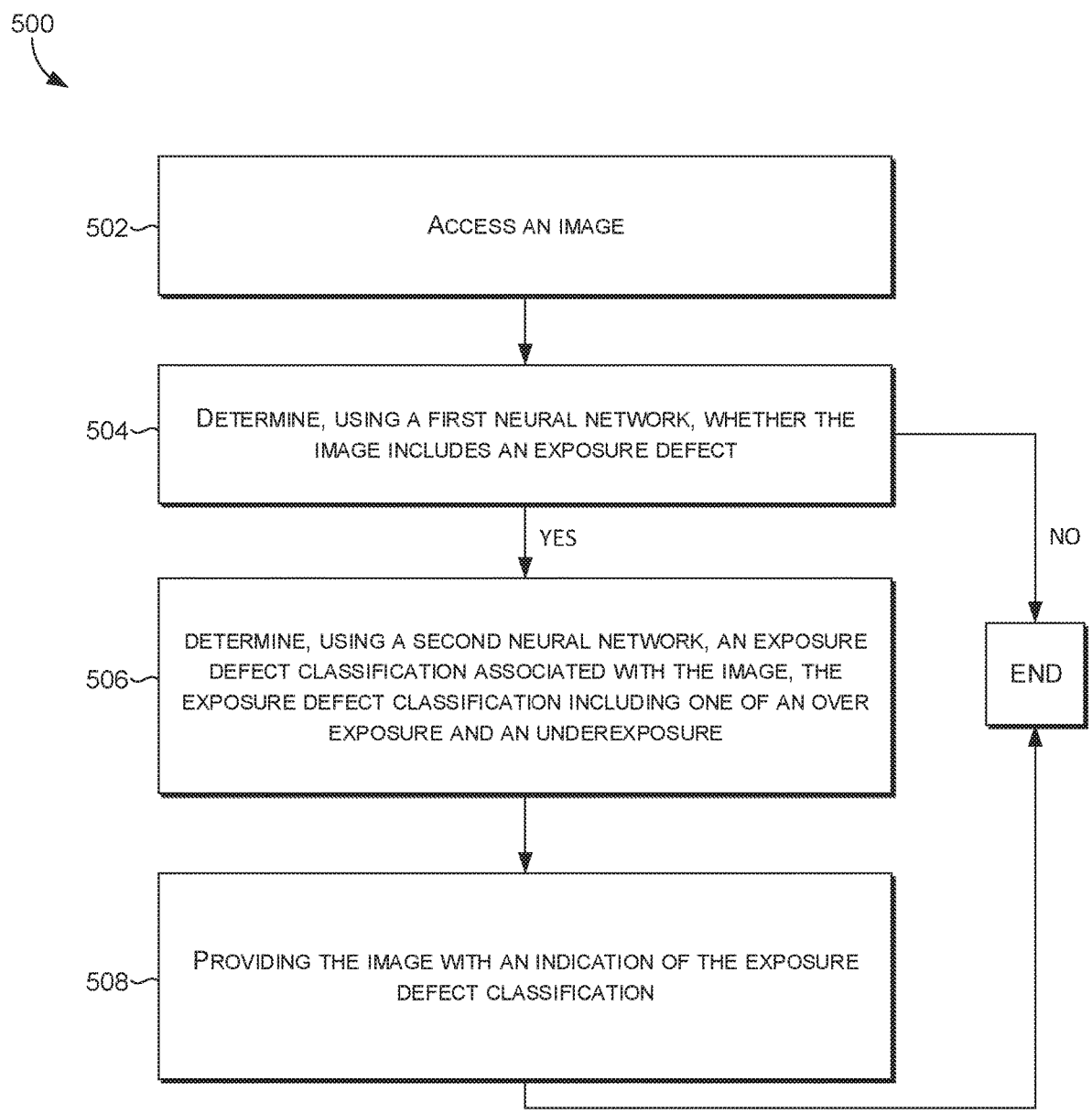
FIG. 5 is a flow diagram showing a method for detecting and classifying an exposure defect in an image, in accordance with embodiments of the present invention.

With reference now to FIG. 5, a flow diagram is provided illustrating a method for detecting and classifying an exposure defect in an image according to the present disclosure.

Each block of the method 500 comprise a computing process performed using any combination of hardware, firmware, and/or software. For instance, various functions can be carried out by a processor executing instructions stored in memory. The method can also be embodied as computer-usable instructions stored on computer storage media. The method can be provided by a standalone application, a service or hosted service (standalone or in combination with another hosted service), or a plug-in to another product, to name a few.

Initially, at block 502, an image is accessed. The image may be received by an image receiver, such as the image receiver 132 of FIG. 1. The image may accessed from a digital media gallery, such as the digital media gallery 115 of client device 110 of FIG. 1. At block 504, a first neural network is used to determine whether the image includes an exposure defect. A binary model, such as the binary model 134 of FIG. 1, may be used to determine whether the received image includes an exposure defect by classifying the image as a defective image or a well-exposed image.

At block 504, in response to determining that the image does not include an exposure defect, the method ends. In some examples, in response to determining that the image does not include an exposure defect, the image may be classified as a well-exposed image.

At block 506, in response to determining that the image includes the exposure defect, a second neural network is used to determine an exposure defect classification associated with the image. The exposure defect classification including one of an overexposure and an underexposure. For example, a classification model, such as the classification model 136 of FIG. 1 may be used to classify the defective image as including or suffering from an overexposure or an underexposure. In some examples, the classification model can also determine an exposure score indicating a level of exposure defect detected in the image. The exposure score may then be used by the classification model to determine the exposure defect classification associated with the image.

At block 508, the image with an indication of the exposure defect classification is provided. The image with an indication of the exposure defect classification may be provided or presented via a user interface of a client device, such as the client device 110 of FIG. 1.

Exemplary Operating Environment

Figure 6:
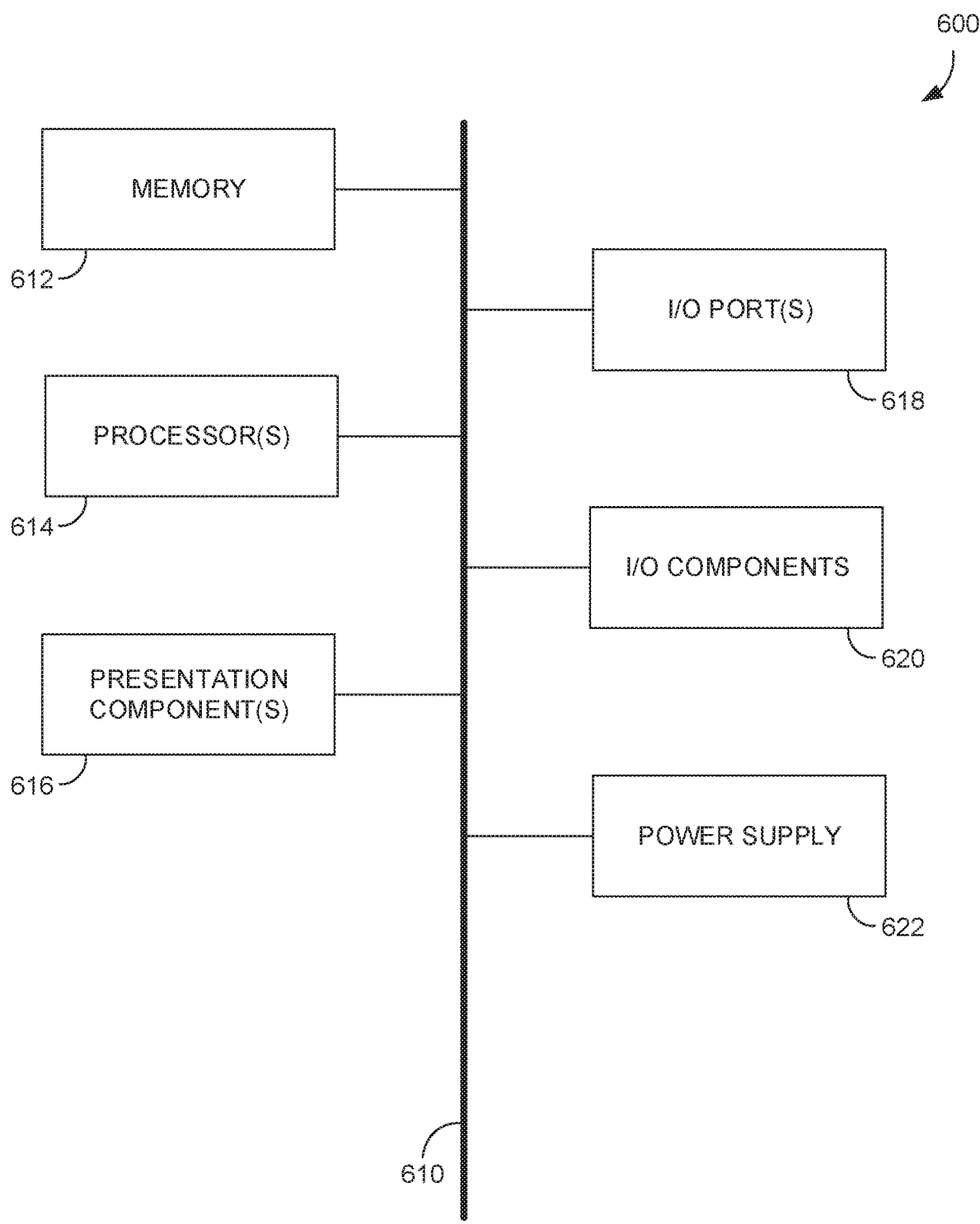
FIG. 6 is a block diagram of an exemplary computing device suitable for use in implementing embodiments of the present invention.

Having described an overview of embodiments of the present invention, an exemplary operating environment in which embodiments of the present invention may be implemented is described below in order to provide a general context for various aspects of the present invention. Referring now to FIG. 6 in particular, an exemplary operating environment for implementing embodiments of the present invention is shown and designated generally as computing device 600. Computing device 600 is but one example of a suitable computing environment and is not intended to suggest any limitation as to the scope of use or functionality of the invention. Neither should computing device 600 be interpreted as having any dependency or requirement relating to any one or combination of components illustrated.

The invention may be described in the general context of computer code or machine-useable instructions, including computer-executable instructions such as program modules, being executed by a computer or other machine, such as a cellular telephone, personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 6, computing device 600 includes bus 610 that directly or indirectly couples the following devices: memory 612, one or more processors 614, one or more presentation components 616, input/output (I/O) ports 618, input/output components 620, and illustrative power supply 622. Bus 610 represents what may be one or more busses (such as an address bus, data bus, or combination thereof). Although the various blocks of FIG. 6 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventor recognizes that such is the nature of the art, and reiterates that the diagram of FIG. 6 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 6 and reference to "computing device."

Computing device 600 typically includes a variety of computer-readable media. Computer-readable media can be any available media that can be accessed by computing device 600 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 600. Computer storage media is non-transitory and does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 612 includes computer-storage media in the form of volatile and/or nonvolatile memory. The memory may be removable, non-removable, or a combination thereof. Exemplary hardware devices include solid-state memory, hard drives, optical-disc drives, etc. Computing device 600 includes one or more processors that read data from various entities such as memory 612 or I/O components 620. Presentation component(s) 610 present data indications to a user or other device. Exemplary presentation components include a display device, speaker, printing component, vibrating component, etc.

I/O ports 618 allow computing device 600 to be logically coupled to other devices including I/O components 620, some of which may be built in. Illustrative components include a microphone, joystick, game pad, satellite dish, scanner, printer, wireless device, touch pad, touch screen, etc. The I/O components 620 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of computing device 600. Computing device 600 may be equipped with depth cameras, such as stereoscopic camera systems, infrared camera systems, RGB camera systems, touchscreen technology, and combinations of these, for gesture detection and recognition. Additionally, the computing device 600 may be equipped with accelerometers or gyroscopes that enable detection of motion. The output of the accelerometers or gyroscopes may be provided to the display of computing device 600 to render immersive augmented reality or virtual reality.

Embodiments described herein support exposure defect detection and classification in digital media. The components described herein refer to integrated components of a defect detection system. The integrated components refer to the hardware architecture and software framework that support functionality using the defect detection system. The hardware architecture refers to physical components and interrelationships thereof and the software framework refers to software providing functionality that can be implemented with hardware embodied on a device.

The end-to-end software-based defect detection system can operate within the defect detection system components to operate computer hardware to defect detection system functionality. At a low level, hardware processors execute instructions selected from a machine language (also referred to as machine code or native) instruction set for a given processor. The processor recognizes the native instructions and performs corresponding low level functions relating, for example, to logic, control and memory operations. Low level software written in machine code can provide more complex functionality to higher levels of software. As used herein, computer-executable instructions includes any software, including low level software written in machine code, higher level software such as application software and any combination thereof. In this regard, the defect detection system components can manage resources and provide services for the defect management system functionality. Any other variations and combinations thereof are contemplated with embodiments of the present invention.

Having identified various components in the present disclosure, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions, etc.) can be used in addition to or instead of those shown.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A method comprising:
   executing a first classification model on each image of a collection of images, the first classification model outputting a binary classification indicating whether each image includes an exposure defect;
   executing a second classification model on a subset of defective images from the collection of images classified by the first classification model to have the exposure defects, the second classification model outputting a level of exposure for each image of the subset; and
   executing an action using the subset of the collection of images.

2. The method of claim 1, wherein the binary classification for each image is determined using a first neural network to generate a confidence score associated with the image, the confidence score indicating a probability that the image includes an exposure defect.

3. The method of claim 1, wherein the binary classification for each image is determined from a predicted confidence score for each image in the subset of the collection of images being above a predetermined threshold confidence score.

4. The method of claim 1, wherein the first classification model determines the binary classification for each image by:

calculating a confidence score associated with each image, the confidence score indicating a probability that the image includes the exposure defect; and determining that the confidence score is above a predetermined threshold confidence score.

5. The method of claim 1, wherein the action comprises causing a user interface to present a particular image of the collection of images with a representation of the binary classification indicating whether the particular image includes the exposure defect.

6. The method of claim 1, wherein the action comprises deleting one or more of the defective images from the collection of images based on the level of exposure of each of the defective images.

7. The method of claim 1, wherein the action comprises changing an exposure of one or more of the defective images from the collection of images based on an exposure score of each of the defective images determined by the second classification model.

8. The method of claim 1, wherein the action comprises causing a user interface to present one or more of the defective images based on the level of exposure.

9. The method of claim 1, wherein the action comprises causing a user interface to present a representation of a number of the defective images based on an exposure score determined by the second classification model.

10. One or more computer storage media storing computer-useable instructions that, when executed by one or more computing devices, cause the one or more computing devices to perform operations comprising:

classifying, using a first classification model, each image of a collection of images with a binary classification indicating whether the image includes an exposure defect;

classifying, using a second classification model, each image of a subset of defective images having the exposure defect based on a level of exposure; and executing an action based on the subset of the collection of images.

11. The one or more computer storage media of claim 10, wherein the action comprises causing a user interface to present a particular image of the collection of images with a representation of the binary classification indicating whether or not the particular image includes the exposure defect.

12. The one or more computer storage media of claim 10, wherein the action comprises deleting one or more of the defective images from the collection of images based on the level of exposure of each of the defective images.

13. The one or more computer storage media of claim 10, wherein the action comprises deleting one or more of the defective images from the collection of images based on an exposure score of each of the defective images determined by the second classification model.

14. The one or more computer storage media of claim 10, wherein the action comprises causing a user interface to present one or more of the defective images based on the level of exposure.

15. The one or more computer storage media of claim 10, wherein the action comprises causing a user interface to present a representation of a number of the defective images based on an exposure score determined by the second classification model.

16. A system comprising one or more processors and memory configured to provide computer program instructions to the one or more processors, the computer program instructions comprising:

a defect detector configured to:

execute a first classification model configured to classify each image of a collection of images with a binary classification that indicates whether the image includes an exposure defect;

execute a second classification model configured to classify defective images of a subset of images indicated as including the exposure defect according to a level of exposure for each image of the subset; and executing an action based on the subset of the collection of images.

17. The system of claim 16, wherein the action comprises causing a user interface to present a particular image of the collection of images with a representation of the binary classification indicating whether the particular image includes the exposure defect.

18. The system of claim 16, wherein the action comprises deleting one or more of the defective images from the collection of images based on the level of exposure of each of the defective images.

19. The system of claim 16, wherein the action comprises deleting one or more of the defective images from the collection of images based on an exposure score of each of the defective images determined by the second classification model.

20. The system of claim 16, wherein the action comprises causing a user interface to present one or more of the defective images based on the level of exposure.

* * * * *